US009260007B2

(12) United States Patent
Sakaguchi

(10) Patent No.: US 9,260,007 B2
(45) Date of Patent: Feb. 16, 2016

(54) COOLING SYSTEM FOR COOLING MOTOR AND GENERATOR IN HYBRID VEHICLE

(75) Inventor: Yoshihiro Sakaguchi, Okazaki (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 215 days.

(21) Appl. No.: 13/289,676

(22) Filed: Nov. 4, 2011

(65) Prior Publication Data

US 2012/0111543 A1 May 10, 2012

(30) Foreign Application Priority Data

Nov. 5, 2010 (JP) ................. 2010-248031

(51) Int. Cl.
| B60H 1/32 | (2006.01) |
| F25B 27/00 | (2006.01) |
| B60K 11/02 | (2006.01) |
| B60K 1/02 | (2006.01) |
| B60K 17/356 | (2006.01) |
| B60K 1/00 | (2006.01) |

(52) U.S. Cl.
CPC . *B60K 11/02* (2013.01); *B60K 1/02* (2013.01); *B60K 17/356* (2013.01); *B60K 2001/006* (2013.01); *B60Y 2400/61* (2013.01)

(58) Field of Classification Search
CPC ..... B60K 1/02; B60K 2001/003; B60K 11/02
USPC ............. 62/243, 239, 323.1, 323.3, 241
See application file for complete search history.

(56) References Cited

U.S. PATENT DOCUMENTS

| 6,201,365 | B1 | 3/2001 | Hara et al. | |
| 6,323,613 | B1* | 11/2001 | Hara et al. | 318/471 |
| 6,833,641 | B2* | 12/2004 | Uchida et al. | 310/54 |
| 2004/0124722 | A1 | 7/2004 | Uchida et al. | |
| 2005/0274507 | A1* | 12/2005 | Sanada et al. | 165/202 |
| 2006/0231339 | A1 | 10/2006 | Enomoto et al. | |
| 2010/0127583 | A1* | 5/2010 | Yoshida et al. | 310/59 |
| 2011/0067942 | A1* | 3/2011 | Takei | 180/291 |
| 2012/0130576 | A1* | 5/2012 | Sugiyama et al. | 701/22 |

FOREIGN PATENT DOCUMENTS

| CN | 100999188 A | 7/2007 |
| CN | 101128689 A | 2/2008 |
| JP | 10-266855 A | 10/1998 |

(Continued)

OTHER PUBLICATIONS

Japanese Office Action issued Nov. 13, 2012 with English Translation.

(Continued)

*Primary Examiner* — Cassey D Bauer
*Assistant Examiner* — Joseph Trpisovsky
(74) *Attorney, Agent, or Firm* — Birch, Stewart, Kolasch & Birch, LLP

(57) ABSTRACT

A cooling system to be mounted in a hybrid vehicle including a motor driven and a generator includes a cooling path and a pressurizing unit. In the cooling path, coolant for cooling the motor and the generator is recirculated. The pressurizing unit pumps the coolant. The motor is disposed downstream of the pressurizing unit in a recirculating direction of the coolant. The generator is disposed downstream of the motor and upstream of the pressurizing unit in the recirculating direction.

5 Claims, 6 Drawing Sheets

(56) References Cited

FOREIGN PATENT DOCUMENTS

| | | |
|---|---|---|
| JP | 2001-238405 A | 8/2001 |
| JP | 2004-332744 A | 11/2004 |
| JP | 2007-216791 A | 8/2007 |
| JP | 2010-163053 A | 7/2010 |
| JP | 2011-213290 A | 10/2011 |
| JP | 2011-259634 A | 12/2011 |
| WO | WO 2006/101097 A1 | 9/2006 |
| WO | WO 2010/058768 A1 | 5/2010 |

OTHER PUBLICATIONS

Chinese Office Action dated Jul. 8, 2014 for Chinese Application No. 201110349241.3 with English translation.

* cited by examiner

COOLING SYSTEM FOR COOLING MOTOR AND GENERATOR IN HYBRID VEHICLE

BACKGROUND OF THE INVENTION

1. Field of the Invention

The present invention is related to a cooling system and more particularly to a cooling system mounted in a hybrid vehicle.

2. Description of the Related Art

In recent years, hybrid vehicles have been propagating in which an internal combustion engine, a motor for driving the vehicle and a generator for generating electricity are mounted. As a configuration of a conventional hybrid vehicle, there is known a configuration in which a motor and a generator are disposed coaxially in a transverse direction of the vehicle (refer to Patent Document 1).

Although the motor and the generator are heated to high temperatures while the hybrid vehicle is driven, since the heat resistance temperatures of the motor and the generator are limited, a cooling system is provided for cooling them by recirculating oil or water in general through a coolant piping by a pump. Thus, the motor and the generator are cooled by the common cooling system.

Here, an example of a conventional cooling system for a motor and a generator in a hybrid vehicle will be described. FIG. 5 is an exemplary diagram showing a state in which an oil pump in the conventional cooling system is operating. In addition, FIG. 6 is an exemplary diagram showing a state in which the oil pump in the conventional cooling system is stopped.

As shown in FIGS. 5 and 6, a conventional cooling system includes an oil cooler 102 for cooling oil which cools the motor 100 and an oil pump 101 for pumping oil. The motor 100 is mainly made up of a rotor 100a and a stator 100b which are set concentrically within a housing 100c. Coils are wound around the stator 100b of the motor 100 (the illustration of which is omitted). An oil reservoir 100d is formed in a bottom portion in an interior of the housing 100c of the motor 100 for preventing the oil pump 101 from drawing air thereinto.

A first oil piping 103 is placed between a lower portion of the motor 100 and the oil pump 101. Oil reserved in the oil reservoir 100d in the motor 100 is supplied to the oil pump 101 through the first oil piping 103. A second oil piping 104 is placed between the oil pump 101 and the oil cooler 102. Oil pressurized by the oil pump 101 is supplied to the oil cooler 102 through the second oil piping 104.

A third oil piping 105 is placed between the oil cooler 102 and an upper portion of the housing 100c of the motor 100. Oil cooled in the oil cooler 102 is supplied to the motor 100 through the third oil piping 105. The oil discharged from the third oil piping 105 is poured on to an upper portion of the stator 100b of the motor 100. Accordingly, the rotor 100a and the stator 100b of the motor 100 are cooled.

When the oil pump 101 is in operation, oil is recirculated in a direction indicated by arrows in FIG. 5 through the first oil piping 103 to the third oil piping 105. Hence, when the oil pump 101 is in operation, oil is filled in the first oil piping 103 to the third oil piping 105, and therefore, a level 100e of oil in the oil reservoir 100d in the motor 100 is positioned low.

As shown in FIG. 6, however, when the oil pump 101 is stopped, the oil filled in the first oil piping 103 to the third oil piping 105 is returned to be reserved in the oil reservoir 100d in the motor 100. Therefore, the position of the oil level 100e rises, whereby the rotor 100a of the motor 100 is partially submerged in oil.

In FIGS. 5 and 6, the description is made by showing only the motor 100 as an example of a constituent component. Conventionally, since the motor 100 is disposed coaxially with the generator in the transverse direction of the vehicle, the levels of oil in the motor 100 and the generator are positioned in the same level. When the motor 100 and the generator have the same size, a rotor of the generator is also partially submerged in oil.

In the hybrid vehicle described above, when the temperatures of the motor 100 and the generator are low, the oil pump 101 is operated intermittently, and therefore, there is a situation in which the rotors 100a of the motor 100 and the generator rotate when the oil pump 101 is stopped.

In a series hybrid vehicle in which a motor 100 is driven by using electric power generated in a generator, both the motor 100 and the generator operate in a series driving in which the motor 100 is driven by using electric power generated in the generator. In addition, in an EV driving in which the motor 100 is driven by using electric power of a high-voltage battery, only the motor 100 operates. Because of this, the frequency with which the motor 100 operates becomes high.

However, as has been described above, when the oil pump 101 is stopped, the rotor 100a of the motor 100 is partially submerged in oil reserved in the oil reservoir 100d in the motor 100, and therefore, the rotor 100a of the motor 100 stirs oil in the oil reservoir 100d. Because of this, a stirring resistance is produced in the rotor 100a of the motor 100, leading to a problem that the rotation of the rotor 100a of the motor 100 is disturbed.

[Patent Document 1] JP-A-2010-163053

SUMMARY

It is therefore one advantageous aspect of the present invention to provide a cooling system which can cool a driving motor which operates with high frequency with good efficiency without disturbing the rotation of a rotor of the driving motor.

According to one advantage of the invention, there is provided a cooling system, configured to be mounted in a hybrid vehicle including: a motor driven by electric power supplied from a battery; and a generator configured to be driven by an internal combustion engine when a residual electric power in the battery becomes not larger than a predetermined value so as to charge the battery, the cooling system comprising:

a cooling path in which a coolant for cooling the motor and the generator is recirculated; and a pressurizing unit configured to pump the coolant, wherein the motor is disposed downstream of the pressurizing unit in a recirculating direction of the coolant, and the generator is disposed downstream of the motor and upstream of the pressurizing unit in the recirculating direction.

According to the cooling system according to the invention, even when the pressurizing unit is stopped, the rotor of the motor is not submerged in coolant, and therefore, no large stirring resistance is produced in the rotor of the motor, whereby the required cooling can be implemented with good efficiency without disturbing the rotation of the rotor of the motor which is operated with high frequency.

DETAILED DESCRIPTION OF THE INVENTION

Hereinafter, embodiments a cooling system according to the invention will be described by reference to the drawings.

Figure 3:
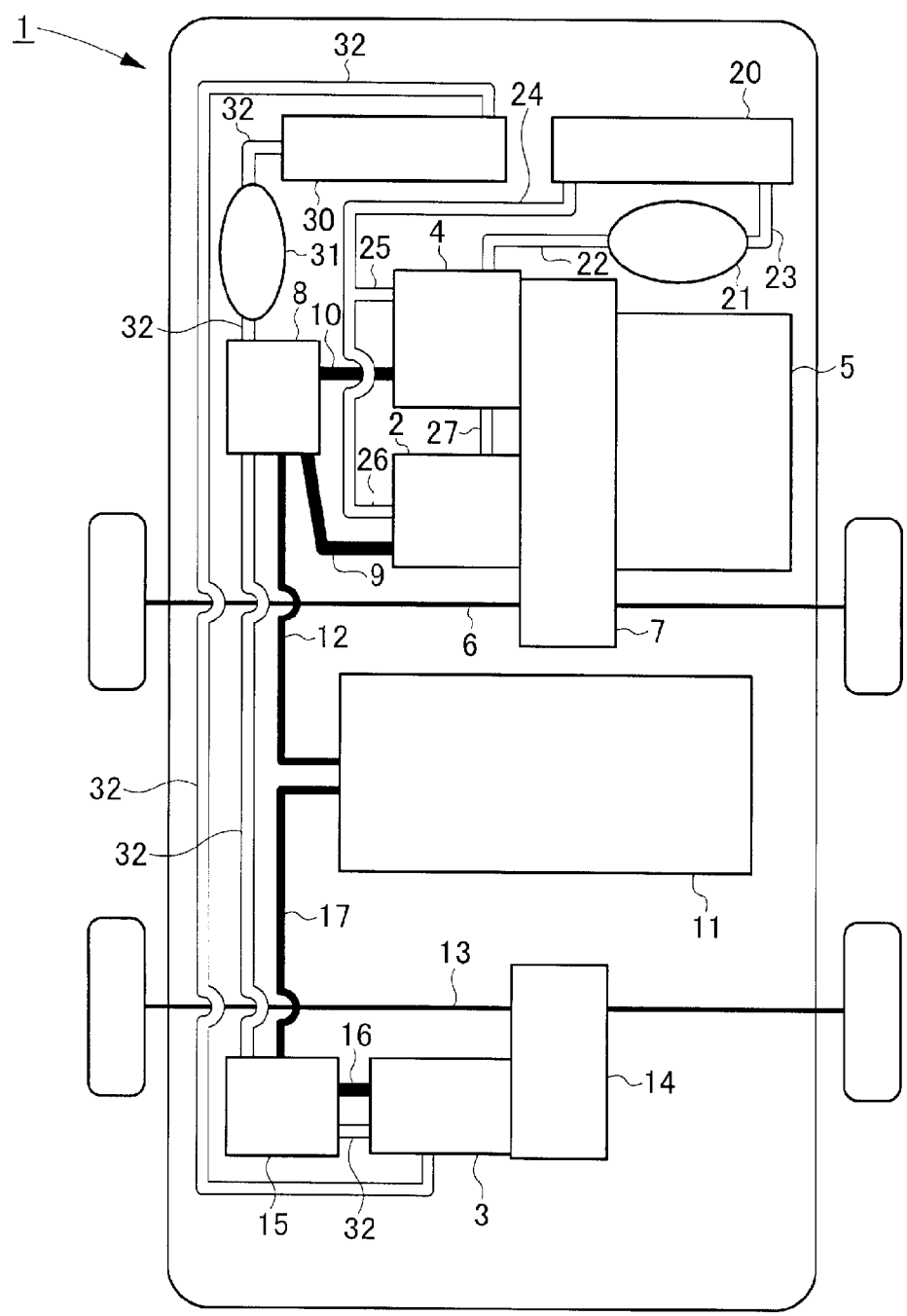
FIG. 3 is an exemplary diagram showing the configuration of a hybrid vehicle in which the cooling system according to the first embodiment of the invention is mounted.

A first embodiment of a cooling system according to the invention will be described. FIG. 3 is an exemplary diagram showing the configuration of a hybrid vehicle in which the cooling system according to this embodiment is mounted. As FIG. 3 shows, a hybrid vehicle 1 according to this embodiment includes a driving front motor (a motor) 2 and a rear motor 3 which drive the hybrid vehicle 1, a generator 4 for generating electricity and an internal combustion engine 5 for driving the generator 4.

In this embodiment, although the description is made by taking the series hybrid vehicle including the front motor 2 and the rear motor 3 for example, the invention can also be applied to a series hybrid vehicle in which only the front motor 2 is provided and, in addition thereto, a parallel hybrid vehicle.

In addition, in this embodiment, although oil is used as a coolant to cool the front motor 2 and the generator 4, other fluids including water may be used.

A front transaxle 7 for transmitting a driving force of the front motor 2 to a front drive shaft 6 and a driving force of the internal combustion engine 5 to the generator 4 is placed between the front motor 2 and the generator 4 and the internal combustion engine 5 and the front drive shaft 6. In addition, the front motor 2 is connected to a front inverter 8 by a three-phase high-voltage wiring harness 9. Additionally, the generator 4 is connected to the front inverter 8 by a three-phase high-voltage wiring harness 10. A high-voltage battery 11 is connected to the front inverter 8 by a high-voltage wiring harness 12.

A rear transaxle 14 for transmitting a driving force of the rear motor 3 to a rear drive shaft 13 is placed between the rear motor 3 and the rear drive shaft 13. In addition, the rear motor 3 is connected to a rear inverter 15 by a three-phase high-voltage wiring harness 16. The high-voltage battery 11 is connected to the rear inverter 15 by a high-voltage wiring harness 17.

In addition, the hybrid vehicle 1 according to the embodiment includes a cooling path which is made up of an oil cooler 20 (a cooling unit) for cooling oil, an oil pump 21 (a pressurizing unit) for pumping oil, and oil pipings 22 to 27 for recirculating oil. The front motor 2 and the generator 4 are connected with each other by the oil cooler 20, the oil pump 21 and the first oil piping 22 to the sixth oil piping 27 and are cooled by oil. The front motor 2 is disposed downstream of the oil pump 21 in an oil recirculating direction, and the generator 4 is disposed downstream of the front motor 2 and upstream of the oil pump 21 in the oil recirculating direction.

In addition, the oil cooler 20 is disposed downstream of the oil pump 21 and upstream of the front motor 2 in the oil recirculating direction.

In addition, the hybrid vehicle 1 according to the embodiment includes a radiator 30 for cooling a coolant, a coolant pump 31 for pumping the coolant and a coolant piping 32 for recirculating the coolant. Then, the rear motor 3, the front inverter 8 and the rear inverter 15 are connected with the radiator 30 and the coolant pump 31 by the coolant piping 32 and are cooled by the coolant.

Figure 1:
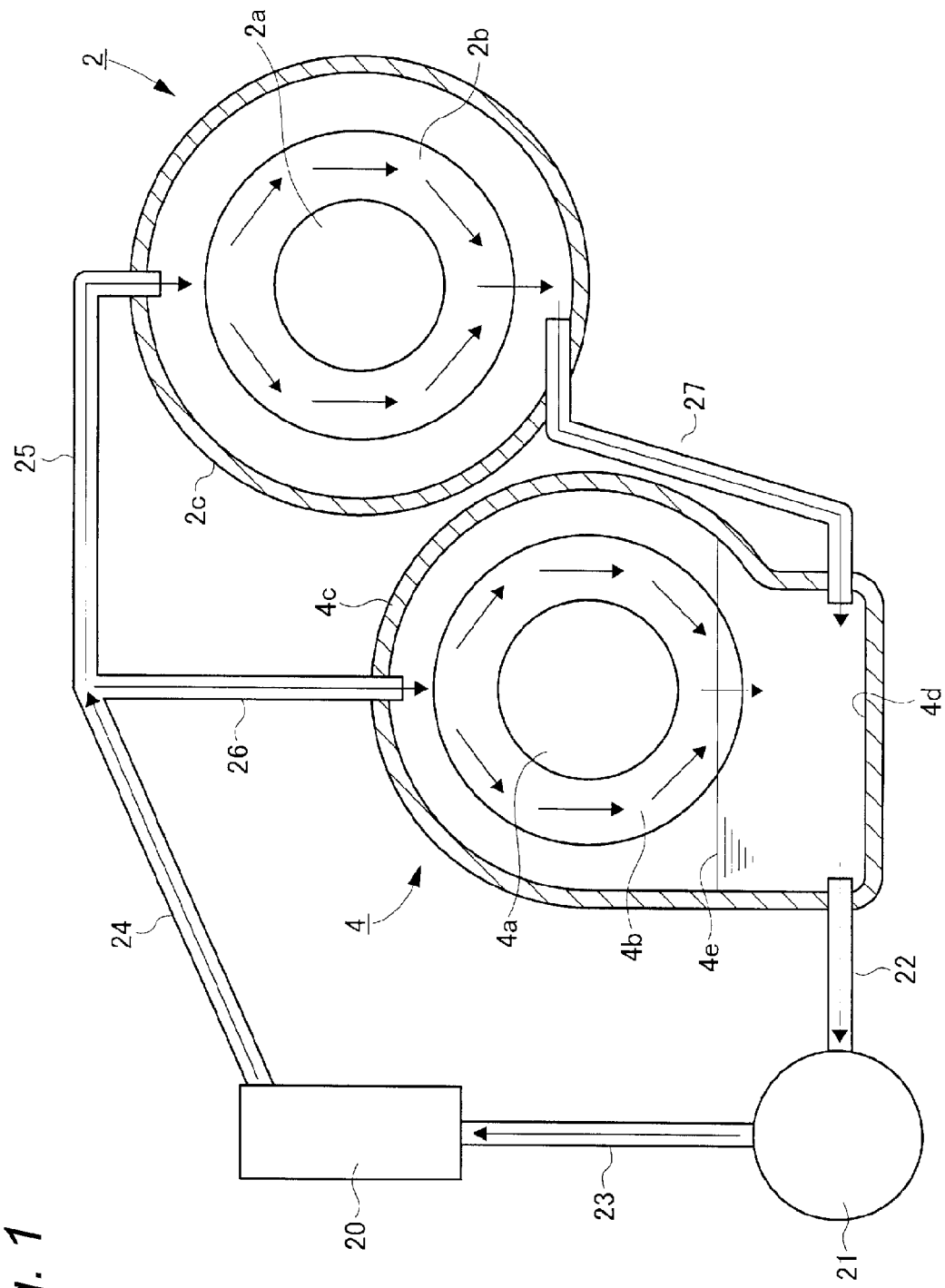
FIG. 1 is an exemplary diagram showing a state in which an oil pump of a cooling system according to a first embodiment of the invention is in operation.

FIG. 1 is an exemplary diagram showing a state in which an oil pump of a cooling system according to a first embodiment of the invention is in operation. As FIG. 1 shows, in the cooling system of the embodiment, the 6position where the front motor 2 is placed is set higher in a gravitational direction than the position where the generator 4 is placed.

The front motor 2 includes mainly a rotor 2a and a stator 2b which are placed concentrically within a housing 2c. Coils are wound around the stator 2b of the front motor 2 (the illustration of which is omitted). The rotor 2a of the front motor 2 outputs a driving force to the front drive shaft 6.

In addition, the generator includes mainly a rotor 4a and a stator 4b which are placed concentrically within a housing 4c. Coils are wound around the stator 4b of the generator 4 (the illustration of which is omitted). The rotor 4a of the generator 4 is rotated by the internal combustion engine 5.

An oil reservoir 4d (a coolant reservoir) is formed in a bottom portion of an interior of the housing 4c of the generator 4 for preventing the oil pump 21 from drawing air thereinto. The first oil piping 22 is placed between a lower portion of the housing 4c of the generator 4 and the oil pump 21. Oil reserved in the oil reservoir 4d in the generator 4 is supplied to the oil pump 21 through the first oil piping 22. The second oil piping 23 is placed between the oil pump 21 and the oil cooler 20. Oil pressurized by the oil pump 21 is supplied to the oil cooler 20 through the second oil piping 23.

The third oil piping 24 and the fourth oil piping 25 are placed between the oil cooler 20 and an upper portion of the housing 2c of the front motor 2. Oil cooled in the oil cooler 20 is supplied to the front motor 2 through the third oil piping 24 and the fourth oil piping 25. Oil discharged from the fourth oil piping 25 is poured on to an upper portion of the stator 2b of the front motor 2. By doing this, the rotor 2a and the stator 2b of the front motor 2 are cooled.

The third oil piping 24 and the fifth oil piping 26 are placed between the oil cooler 20 and an upper portion of the housing 4c of the generator 4. Oil cooled in the coil cooler 20 is supplied to the generator 4 through the third oil piping 24 and the fifth oil piping 26. Oil discharged from the fifth oil piping 26 is poured on to an upper portion of the stator 4b of the generator 4. By doing this, the rotor 4a and the stator 4b of the generator 4 are cooled.

The sixth oil piping (a coolant passage) 27 is placed between a lower portion of the housing 2c of the front motor 2 and a lower portion of the housing 4c of the generator 4. Oil that has cooled the rotor 2a and the stator 2b of the front motor 2 is discharged to the oil reservoir 4d of the generator 4.

When the oil pump 21 is in operation, oil is recirculated as indicated by arrows in FIG. 1 through the first oil piping 22 to the sixth oil piping 27. In this way, when the oil pump 21 is in operation, oil is filled in the first oil piping 22 to the sixth oil piping 27, and therefore, a level 4e of oil in the oil reservoir 4d in the generator 4 is positioned low.

Incidentally, in the cooling system according to this embodiment, when the temperatures of the front motor 2 and the generator 4 are low, the oil pump 21 is operated intermittently, and therefore, there is a situation in which the rotor 2a of the front motor 2 and the rotor 4a of the generator 4 rotate when the oil pump 21 is stopped.

Figure 2:
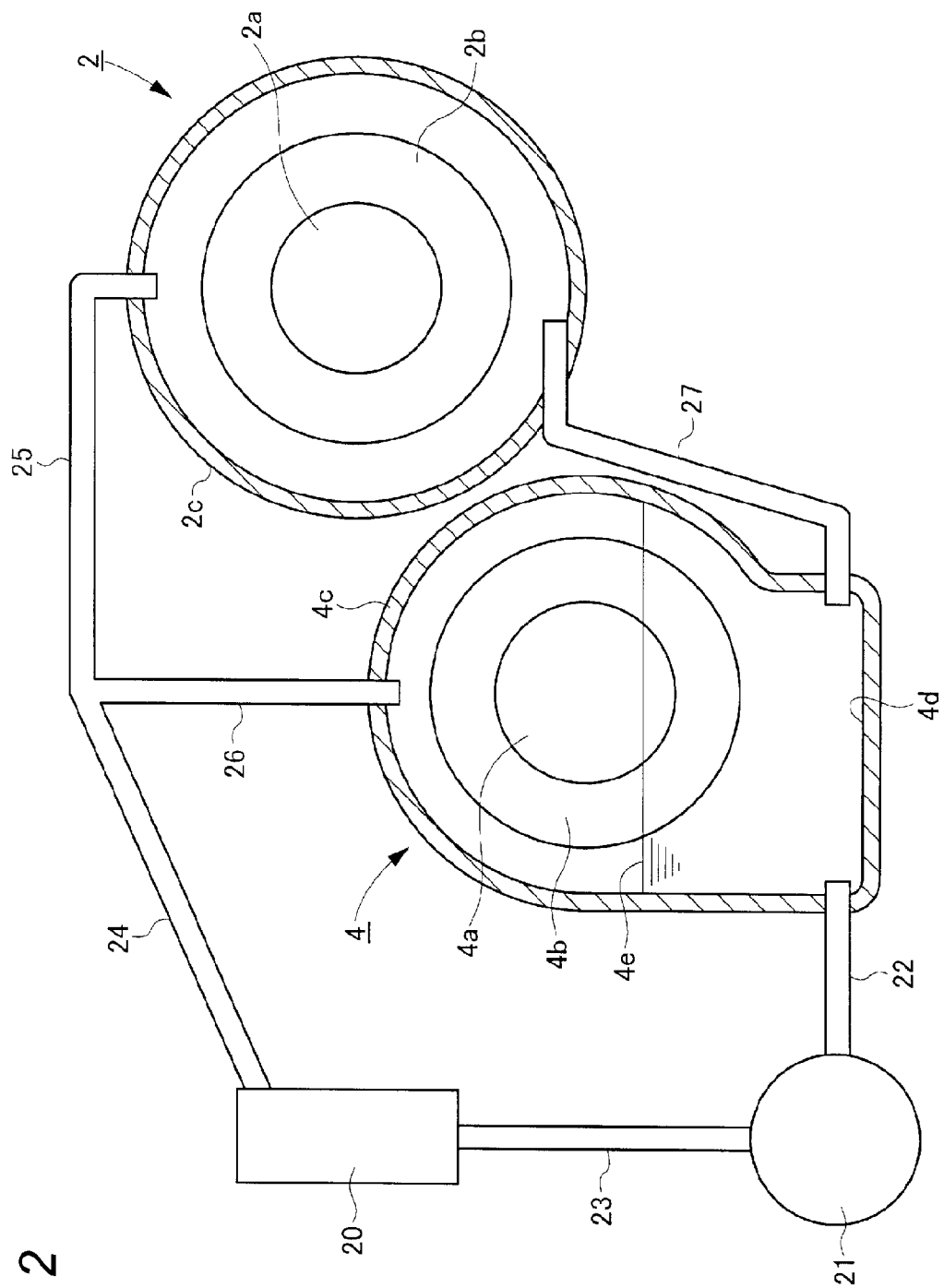
FIG. 2 is an exemplary diagram showing a state in which the oil pump of the cooling system according to the first embodiment of the invention is stopped.

FIG. 2 is an exemplary diagram showing a state in which the oil pump of the cooling system according to the first embodiment of the invention is stopped. As FIG. 2 shows, in the cooling system according to the embodiment, the position where the front motor 2 is placed is set higher than the position where the generator 4 is placed as has been described above. Because of this, even when the oil pump 21 is stopped, there is no such situation that the rotor 2a of the front motor 2 is submerged in oil.

The placement position of the front motor 2 is such that the rotor 2a of the front motor 2 is not submerged in oil, and therefore, the front motor 2 is placed so that a lower end of the rotor 2a of the front motor 2 is positioned higher than the level 4e of oil in the oil reservoir 4d in the generator 4.

Consequently, according to the cooling system according to the embodiment, even when the oil pump 21 is stopped, the rotor 2a of the front motor 2 is not submerged in oil, and therefore, no large stirring resistance is produced in the rotor 2a of the front motor 2, whereby the required cooling can be implemented with good efficiency without disturbing the rotation of the rotor 2a of the front motor 2 which is operated with high frequency.

In addition, the hybrid vehicle 1 according to the embodiment includes the front motor 2 and the rear motor 3. Because of this, in the series driving, the generator 4 needs to generate electric power for driving both the front motor 2 and the rear motor 3, and therefore, a load applied to the generator 4 is larger than a load applied to the front motor 2, and hence, the temperature of the generator 4 is increased higher than that of the front motor 2. Then, oil poured on to the generator 4 from thereabove to cool the generator 4 is heated to a high temperature when the oil reaches the lower portion of the stator 4b of the generator 4, and therefore, the oil cannot cool the lower portion of the stator 4b of the generator 4, leading to a situation in which there is caused a variation in temperature between the upper portion and the lower portion of the stator 4b of the generator 4.

Because of this, as FIG. 1 shows, in the cooling system according to the invention, the level 4e of oil in the oil reservoir 4d in the generator 4 is positioned higher than a lower end of the stator 4b of the generator 4, whereby the lower portion of the stator 4b of the generator 4 which is heated to a high temperature during the series driving can be cooled by oil having a relatively low temperature as a result of flowing along the front motor 2 side where the temperature is kept relatively low during the series driving. Consequently, according to the cooling system according to the embodiment, the variation in temperature of the stator 4b of the generator 4 which is heated to a high temperature during the series driving can be reduced.

Figure 4:
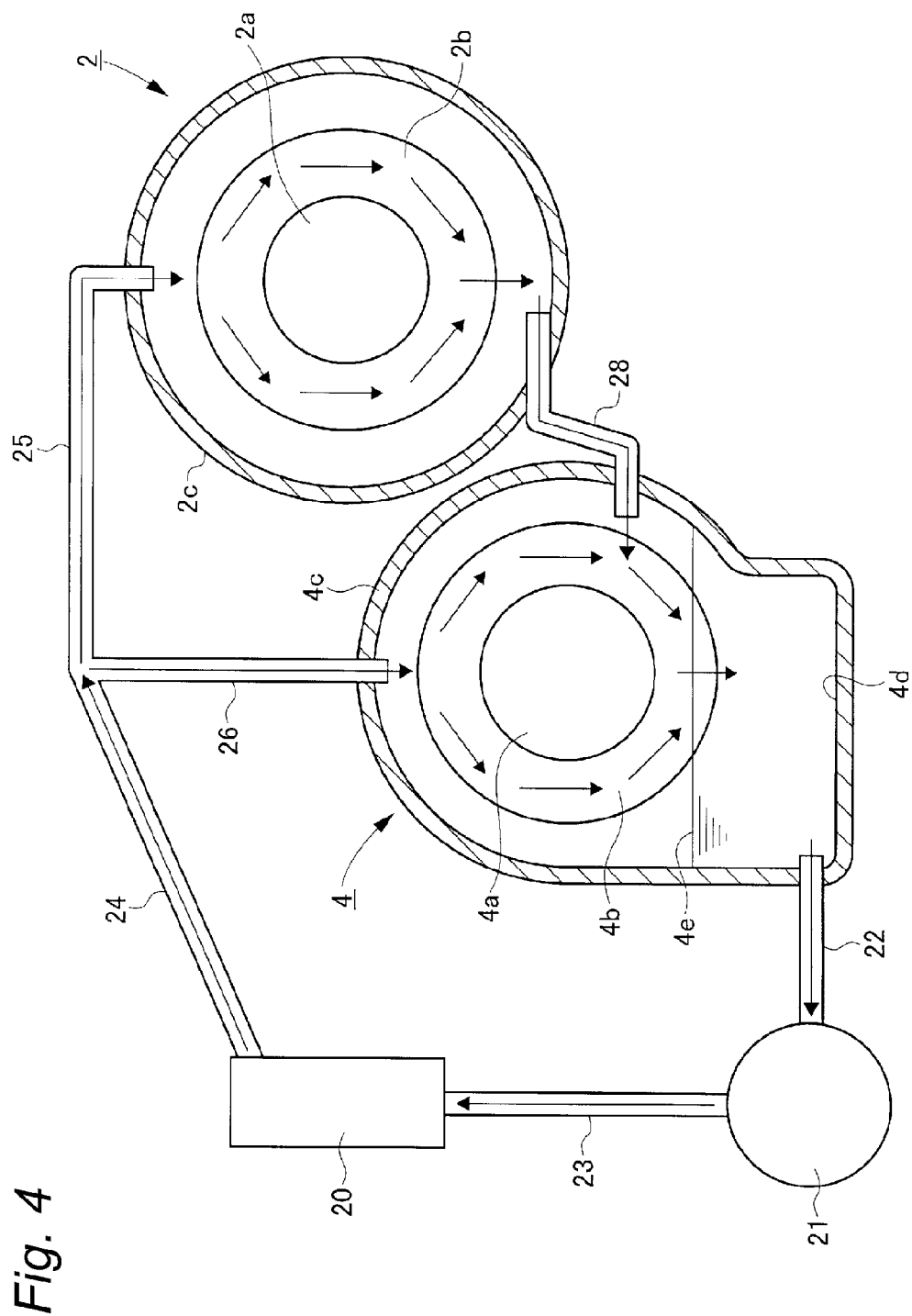
FIG. 4 is an exemplary diagram showing a state in which an oil pump of a cooling system according to a second embodiment of the invention is in operation.
Figure 5:
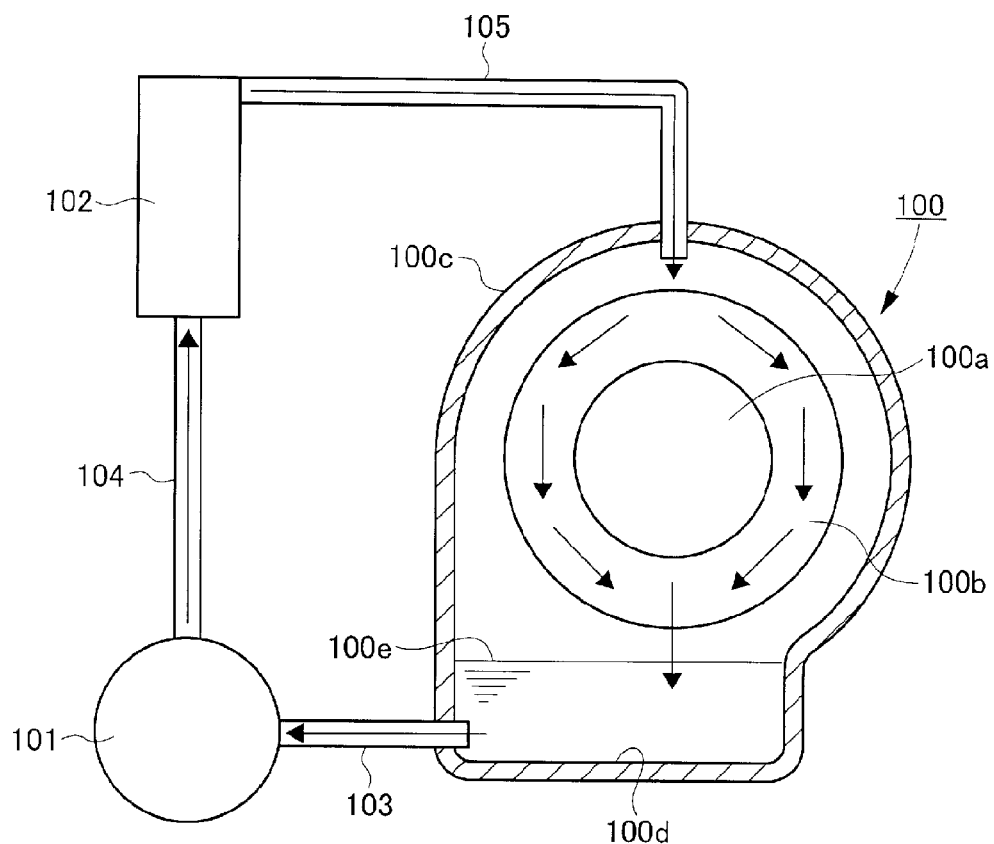
FIG. 5 is an exemplary diagram showing a state in which an oil pump of a conventional cooling system is in operation.
Figure 6:
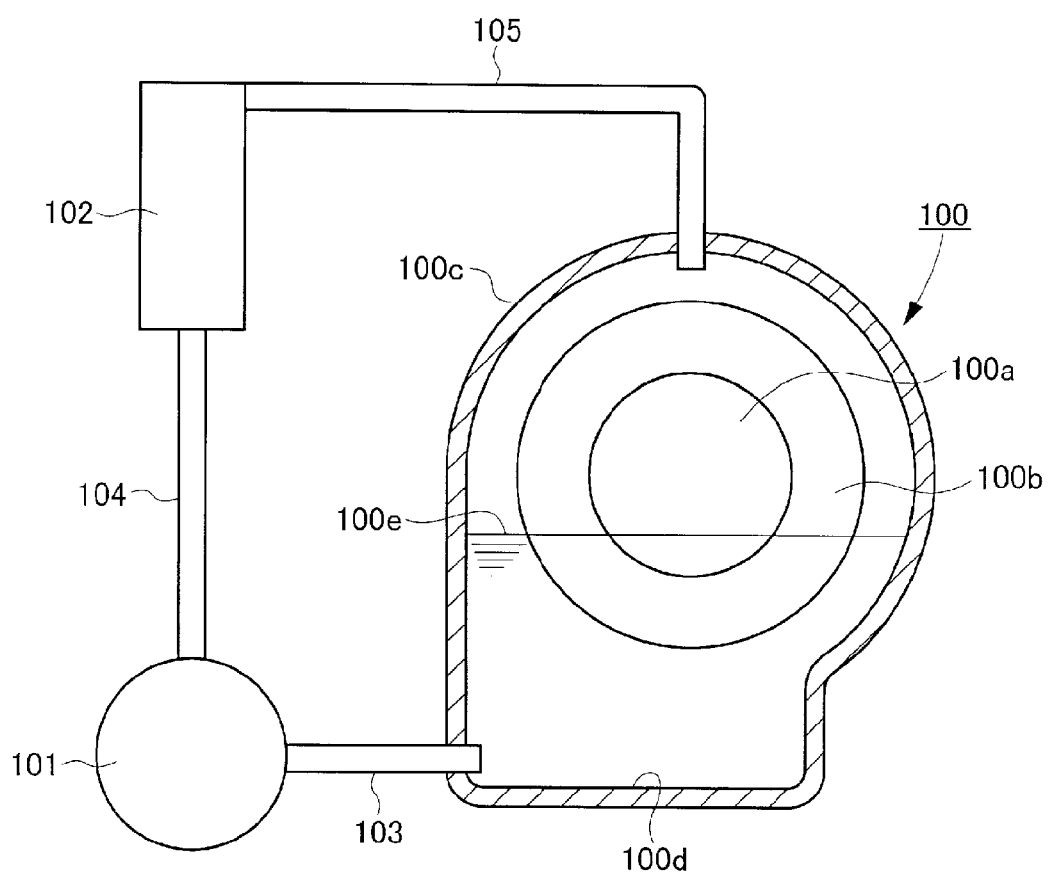
FIG. 6 is an exemplary diagram showing a state in which the oil pump of the conventional cooling system is stopped.

Hereinafter, a second embodiment of a cooling system according to the invention will be described. FIG. 4 is an exemplary diagram showing a state in which an oil pump of a cooling system according to this embodiment is in operation. As FIG. 4 shows, although the configuration of the cooling system according to this embodiment is almost similar to the configuration of the cooling system according to the first embodiment, the second embodiment differs from the first embodiment in that a sixth oil piping 28 is connected to a housing 2c from a lower portion of the housing 2c of a front motor 2 to a lateral side of a generator 4. The sixth oil piping 28 is connected to the housing 2c at the side of a lower portion of a stator 4b of the generator 4.

Because of this, in the cooling system according to this embodiment, by connecting the sixth oil piping 28 from the lower portion of the housing 2c of the front motor 2 to the side of the lower portion of the stator 4b in a housing 4c of the generator 4 so as to pour oil having a relatively low temperature as a result of flowing along the front motor 2 side where the temperature is kept relatively low during the series driving directly on to the lower portion of the stator 4b of the generator 4, the lower portion of the stator 4b of the generator 4 which is heated to a high temperature during the series driving can be cooled. Consequently, according to the cooling system according to this embodiment, variation in temperature of the stator 4b of the generator 4 which is heated to a high temperature during the series driving can be reduced further.

The invention is not limited to the embodiments that have been described heretofore but may be altered or modified variously without departing from the spirit and scope of the invention.

The invention can be used in, for example, a hybrid vehicle including a motor and a generator.

What is claimed is:

1. A cooling system, configured to be mounted in a hybrid vehicle including: a motor driven by electric power supplied from a battery; and a generator configured to be driven by an internal combustion engine when a residual electric power in the battery becomes lower than a predetermined value so as to charge the battery, the cooling system comprising:
   a cooling path in which a coolant for cooling the motor and the generator is recirculated; and
   a pressurizing unit configured to pump the coolant;
   a generator housing, configured to accommodate the generator, and having a coolant reservoir in a bottom portion of an interior of the generator housing; and
   a motor housing, configured to accommodate the motor, wherein
   the motor is placed so that a lower end of the rotor of the motor is positioned higher than a level of the coolant in the coolant reservoir,
   the motor is disposed downstream of the pressurizing unit in a recirculating direction of the coolant, and the generator is disposed downstream of the motor and upstream of the pressurizing unit in the recirculating direction,
   the cooling path includes a coolant piping through which the coolant directly flows from a lower end of the motor housing to the generator housing such that the coolant is discharged into the generator housing in a lateral direction from a height corresponding to a lower portion of a stator of the generator or lower,
   when the pressurizing unit is stopped, a rotor of the motor is exposed from the coolant, and
   the level of the coolant in the coolant reservoir is higher than a lower end of the stator of the generator, such that the lower end of the stator is constantly submerged under the coolant.

2. The cooling system as set forth in claim 1, wherein a downstream end of the coolant piping is connected to a coolant reservoir of the generator housing.

3. The cooling system as set forth in claim 1, further comprising:
   a cooling unit, configured to cool the coolant, and disposed downstream of the pressurizing unit and upstream of the motor.

4. The cooling system as set forth in claim 1, wherein a downstream end of the coolant piping is connected to the generator housing at a lateral side of the generator.

5. The cooling system as set forth in claim 1, wherein the motor is disposed higher than the generator.

* * * * *